United States Patent [19]
Trauzettel

[11] Patent Number: 5,704,124
[45] Date of Patent: Jan. 6, 1998

[54] PROCESS FOR PRODUCING AN AXLE BEARING/BEARING HOUSING ASSEMBLY

[75] Inventor: Gerhard Trauzettel, Berlin, Germany

[73] Assignee: Mercedes-Benz AG, Stuttgart, Germany

[21] Appl. No.: 498,333

[22] Filed: Jul. 5, 1995

[30] Foreign Application Priority Data

Jun. 7, 1994 [DE] Germany ............... 44 23 588.7

[51] Int. Cl.$^6$ ............................................. B23P 15/00
[52] U.S. Cl. ............................. 29/898.04; 29/447
[58] Field of Search ............... 29/898, 898.04, 29/447

[56] References Cited

U.S. PATENT DOCUMENTS

| 1,452,603 | 4/1923 | Himes . | |
|---|---|---|---|
| 2,779,641 | 1/1957 | Sulowski . | |
| 3,923,350 | 12/1975 | Berry . | |
| 4,172,310 | 10/1979 | Mincuzzi . | |
| 4,629,354 | 12/1986 | Freese | 29/447 |
| 4,688,385 | 8/1987 | Shibashita et al. | 60/646 |
| 4,934,743 | 6/1990 | Kapgaw et al. | 285/23 |
| 5,267,384 | 12/1993 | Teeslink | 29/402.09 |
| 5,277,435 | 1/1994 | Krämer et al. | 29/447 |
| 5,362,201 | 11/1994 | Uhmer et al. | 415/111 |
| 5,461,766 | 10/1995 | Burward-Hoy | 29/447 |

FOREIGN PATENT DOCUMENTS

| 23 33 040 | 1/1975 | Germany . |
| 38 39 643 | 3/1990 | Germany . |
| 3833331 | 4/1990 | Germany . |
| 3934125 | 4/1990 | Germany . |
| 5484157 | 4/1979 | Japan . |
| 260898 | 6/1926 | United Kingdom . |
| 813301 | 5/1957 | United Kingdom . |
| 1389410 | 4/1975 | United Kingdom . |
| 1 395 157 | 5/1975 | United Kingdom . |

Primary Examiner—David P. Bryant
Assistant Examiner—Marc W. Butler
Attorney, Agent, or Firm—Klaus J. Bach

[57] ABSTRACT

In a process for producing a shaft bearing-bearing housing assembly wherein the shaft bearing has an outer race firmly engaged in the bearing housing, a shaft bearing with a slightly conical outer surface is fitted into a slightly conical receiving bore formed in the bearing housing at an elevated temperature which is higher than the normal operating temperature of the bearing housing and the bearing housing is then permitted to cool down thereby providing for firm engagement of the shaft bearing outer race in the bearing housing.

8 Claims, 1 Drawing Sheet

PROCESS FOR PRODUCING AN AXLE BEARING/BEARING HOUSING ASSEMBLY

BACKGROUND OF THE INVENTION

The invention relates to a process of producing a shaft bearing-bearing housing assembly as it is used, for example, for mounting the impeller shaft of water pump of a motor-vehicle coolant circuit.

A bearing housing for such an assembly is described, for example, in the Offenlegungsschrift DE 38 33 331 A1. It consists of plastic but metallic bearing housings are also known. The bearing housing described therein has a bearing cylinder for receiving a shaft bearing, which cylinder has a constant diameter, except for various clearances, e.g. for positioning securing elements and seals. In order to secure the shaft bearing in the bearing cylinder, the latter is provided with a suitable seat structure and a separate axial securing part which has to be firmly mounted in the housing. The seat as well as the bearing-cylinder internal diameter, have to be produced in a highly precise manner since specific positional accuracy and freedom of play for the bearing to be inserted are required.

The Patent Publication JP 54-84157 discloses a process for pressing a bearing sleeve of uniform external diameter into a receiving bore which likewise has a uniform diameter, wherein the bearing sleeve is first compressed so as to become conical such that it can be fitted more easily into the receiving bore. The bearing sleeve then reassumes its original cylindrical configuration with uniform diameter when pressed further into the receiving bore.

It is known from Patent Document U.S. Pat. No. 2,779,641 to produce a conical receiving bore for a bearing housing and conical outer surface of a ball-bearing outer race, which is to be inserted into the bore, in such a way that an axial saw-tooth configuration is formed wherein the sawtooth portions press into the surrounding bore wall when the ball-bearing race is pressed into the bore.

Furthermore, shaft mounts are known, wherein a bearing bushing arranged on a shaft and having a conical outer surface is received in a bore which is of a corresponding conical configuration, the bearing bushing being retained by being resiliently engaged with the receiving bore. An example of such a mount is shown in Patent Specification DE 39 34 125 C2.

It is the object of the present invention to provide a process for producing a shaft bearing-bearing housing assembly, which-requires the fewest possible manufacturing steps and the lowest possible manufacturing outlay and which makes it possible for the shaft bearing to be firmly secured in the bearing housing, without additional auxiliary means.

SUMMARY OF THE INVENTION

In a process for producing a shaft bearing-bearing housing assembly wherein the shaft bearing has an outer race firmly engaged in the bearing housing, a shaft bearing with a slightly conical outer surface is fitted into a slightly conical receiving bore formed in the bearing housing at an elevated temperature which is higher than the normal operating temperature of the bearing housing and the bearing housing is then permitted-to cool down thereby providing for firm engagement of the shaft bearing outer race in the bearing housing.

The connection between the shaft bearing outer race and the bearing housing is achieved by shrinking the bearing housing annular surface onto the outer surface of the shaft bearing outer race, by cooling of the relevant bearing-housing region. Consequently, upon subsequent use, the shaft bearing outer race surface and bearing housing annular surface are connected such that they are secured with respect to relative movement without additional auxiliary measures, for example securing rings, pins, adhesives or material deformations, being necessary for this purpose. Conventional process steps, such as pressing in, shrinking in or bonding in, with-additional position-securing operations can be omitted. The corresponding conical configuration of the surfaces which are to be connected to one another further omits the necessity for producing a receiving bore involving material removal, for which, in the case of a uniform diameter, shape accuracies in the range of approximately 0.005 mm may be required. Moreover, the shaft bearing can be easily inserted into the receiving bore, in such a manner that any inaccuracies in the cone diameter can be easily compensated for by axial position adjustment during mounting without any detrimental effect to the strength of the subsequent assembly. The conical configuration of the interacting surfaces of the shaft bearing and bearing housing is, furthermore, of particular advantage if, as for example in the case of a water-pump mount for a motorvehicle cooling-water system, there is an axial main loading direction for the shaft retained in the shaft bearing, since the conical orientation can be selected such that the conical opening tapers down in the shaft loading direction. A self-securing shaft mount is thus obtained with very simple means and little expenditure.

Depending on the application, the cone angle is to be selected so as to be suitable in accordance with the shrinkage behavior of the material used for the bearing housing. Typical, advantageous values for the cone angle are between $1.9°$ and $2.1°$. The value for the cone angle can be selected specifically in dependence on the desired axial tolerance of the ends of the supported shaft or of the shaft bearing ends and in the event of using a casting for the bearing housing, also in accordance with the casting specification.

In an advantageous further embodiment of the invention, the bearing housing consists of an aluminum or magnesium casting. The use of a casting eliminates the need for a complex material removing procedure to form the receiving bore. It is advantageous to mount the shaft bearing directly after a punch deburring step at the end of the casting process for the bearing housing. In this case, the residual heat in the casting after the punch deburring step can be utilized for a controlled cooling operation in order to provide for firm engagement of the shaft bearing outer race with the bearing housing annular surface as a result of shrinkage of the latter. This measure utilizes the primary energy retained from the casting process, which keeps the energy requirement low and, moreover, accelerated cool-down. In this arrangement, the shaft bearing can be mounted manually upon removal of the casting or can be integrated into the punch deburring operation of the casting procedure.

As an alternative to integrating such shaft bearing mounting procedure into the casting process, it is possible, to separate, in time, the mounting of the shaft bearing from the production of the bearing housing, whereby the axle bearing is mounted at a later point in time after the bearing housing has been produced. Then the bearing housing is heated in a specific manner to above its later operation temperature in order to achieve the subsequent connection of the bearing housing to the shaft bearing by shrinkage of the bearing-housing annular surface. If the housing is heated, the housing can be accurately cut to provide an accurately sized receiving bore at the assembly site which may be remote from the earlier casting site.

In order to assist the radial position-securing operation, the outer surface of the shaft bearing race may be provided with a certain degree of roughness e.g. in the form of uniform knurled grooves formed into the material of the bearing ring whereby the bearing housing is firmly engaged during the shrinkage process.

A very advantageous sealing arrangement is obtained in conjunction with the invention by a unitized axial slide ring seal which is commercially available and has an elastomer seal vulcanized onto a slide ring.

A simplified and cost-effective variation of the sealing arrangement is provided by a compact bearing with integrated axial slide ring seal (so-called in-bearing seal). Such combined structures that is sealed compact bearings, which eliminate the need for an additional seal for the bearing housing with respect to the water conducting space, are in the process of undergoing development and testing.

DESCRIPTION OF A PREFERRED EMBODIMENTS

Figure 1:
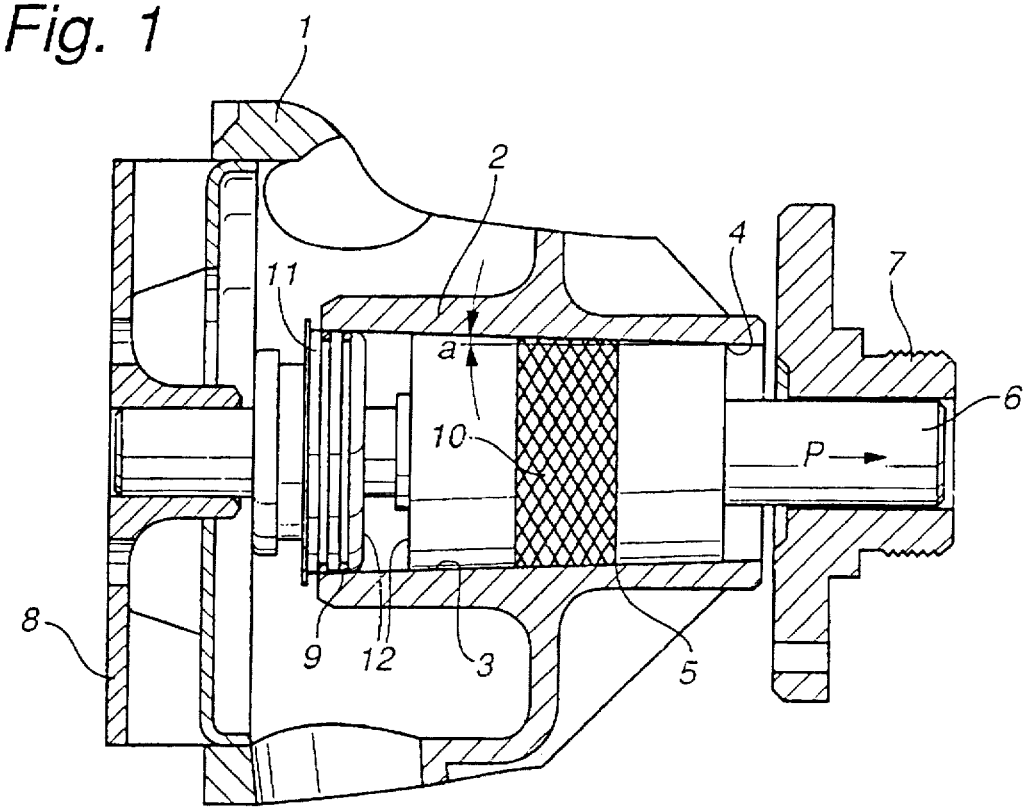
FIG. 1 is a longitudinal cross-sectional view along a line through an axle bearing-bearing housing assembly for a water pump of a coolant circuit in a motor vehicle.

Based on the embodiments of a water pump shaft bearing-bearing housing assembly as represented in the figures, the process for producing the same is explained hereinbelow.

In both figures, functionally identical elements are provided with the same reference numbers, and the explanations below relate to both configurations unless specific reference is made to one of them.

The water pump part shown contains a bearing housing 1 with an integrally formed bearing receiving sleeve 2 and a pump shaft 6 formed as a two-ended journal shaft. The pump shaft also forms the inner race of a compact shaft bearing 12, i.e. of a combined axial and radial bearing. In the case of the assembly according to FIG. 1, a unitized axial slide ring seal 11 with elastomer seal 9 is pressed on one end of the pump shaft 6 in a positionally fixed manner, whereupon the impeller 8 is mounted onto the shaft 6 so as to be fixed with respect to the shaft 6 in an axially proper position with respect to the bearing housing. At its end oppposite the impeller 8, the pump shaft 6 carries a drive piece 7 such as a pulley which is mounted thereon by conventional means in a rotationally fixed manner. Alternatively, in the case of the assembly according to FIG. 2 a suitable axial slide ring seal 11 is provided with a compact bearing 13 and is installed as in-bearing seal as part of, and together with, the compact bearing. In this case, the seal which is part of the bearing housing 1 is installed together with the compact bearing 13 without any further assembly outlay, and the mounting of the impeller takes place again as specified above.

Figure 2:
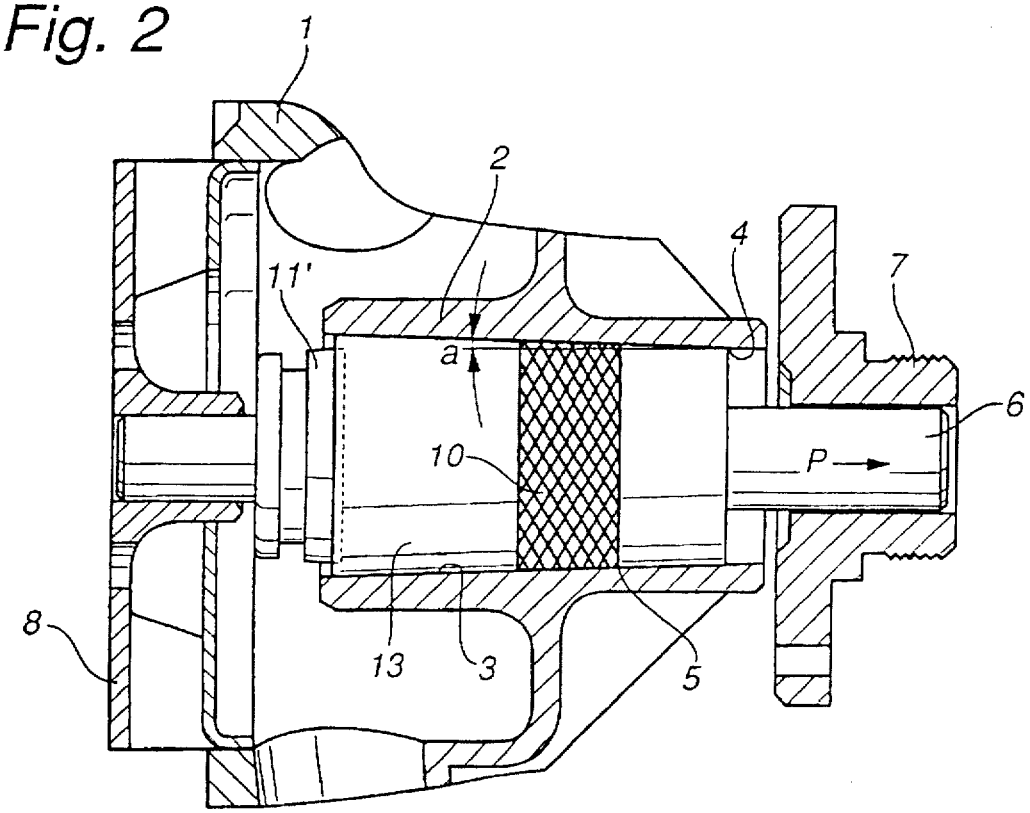
FIG. 2 is a cross-sectional view of an axle bearing-bearing housing assembly as shown in FIG. 1, but with an alternative sealing arrangement.

The production of the shaft bearing-bearing housing assembly begins with the production of the bearing housing 1 and the provision of the impeller 8 and, in the case of the assembly of FIG. 1, the production of the compact bearing 12 and of the pressed-on unitized axial slide ring seal 11, and in the case of the assembly of FIG. 2, the production of the combined compact bearing 13 and integrated in-bearing seal 11. The bearing housing 1 is produced as an aluminum pressure diecast structure, but it is also possible to use another casting material, e.g. magnesium, as an alternative. The inner surface of the bearing-housing sleeve 2 is designed conically in the shape as shown in the drawings by being formed around a solid conical mandrel with a cone angle (a) of 2°. The space bounded by the conical, inner annular sleeve surface 3 formed thereby serves as a receiving bore for an outer race 4 of a shaft. Accordingly, also the shaft bearing outer race 4 is produced with a conical outer surface 5 which corresponds to the sleeve inner surface, of which the cone angle is likewise 2°. With the production of the bearing housing 1 as a casting, there is no need for any complex additional production step, such as the material-removing procedure for forming the receiving bore for the shaft bearing, etc.

The bearing housing 1, which is still hot from the casting process and is above ambient temperature, that is in this case, above the later operating temperature, is subjected to a punch deburring operation. Immediately thereafter the premounted shaft bearing assembly is pushed, with the conically tapered-down shaft bearing region ahead from the conically wider side of the bore defined by the sleeve 2, into the receiving bore until the corresponding conical surfaces 3, 5 on the shaft bearing outer race 4 and on the bearing housing 1, respectively, are engaged with one another along their entire lengths. As far as the strength of the subsequent shaft bearing—bearing housing assembly is concerned, a specific positioning of the shaft bearing in the receiving sleeve 2 is not important; for example, this position can vary around a desired position in an axial direction by approximately 1.5 mm without any detrimental effects. Consequently, correspondingly large production tolerances are acceptable. In this arrangement, the shaft bearing 12 or 13 and be fitted into the sleeve 2 manually upon removal of the bearing housing casting 1, or alternatively automatically, in the pressure diecasting procedure, there being no need for any exertion of force and, in particular, the maintaining of particular positioning accuracies.

After the shaft bearing 12 or 13 has been fitted into the sleeve-receiving bore of the housing 1, the subsequent cooling of the bearing housing 1 ensures that the aluminum. sleeve 2 shrinks and consequently gradually comes to engage in an increasingly firml manner the outer surface 5 of the shaft bearing outer race 4. After cooling of the bearing housing 1 to ambient temperature, such a fixed assembly of the shaft bearing outer race 4 and of the aluminum sleeve 2 is achieved that the two parts can no longer be moved with respect to one another. In order to provide for even better engagement, the shaft bearing outer race 4 is provided on its outer surface 5, in a central region 10, with a roughened surface in the form of a uniform arrangement of grooves into which the aluminum material of the sleeve 2 flows in a position-securing manner during shrinkage. Because the shaft bearing is mounted directly after the casting operation, the heat energy of the casting process is utilized, with the result that there is no need for wasting any additional energy in order to heat the bearing housing 1. If, however, the axle bearing is not to be mounted until at a later point in time, it is, of course, also possible to reheat the aluminum bearing housing 1 to above the intended later operation temperature, and then insert the shaft bearing 12 or 13 and to cool the bearing housing 1 for mounting the axle bearing by shrinkage.

In the shaft bearing-bearing housing assembly of FIG. 1 the impeller side slide ring seal ring 11 of the shaft bearing 12 is located, in the depicted mounted state of the axle bearing 12, in the bearing housing 1 at the wider end of the sleeve 2. The sealing region 11 comprises the unitized axial slide ring seal 11 with attached elastomer seal 9 which, by being pressed axially onto the shaft 6 and into the sleeve 2, separates the shaft bearing space opposite the impeller from the space adjacent the impeller in which the coolant flows. When using the shaft bearing arrangement of FIG. 2, with a combined bearing and axial slide ring seal, the need for mounting a separate seal is omitted.

The described manufacturing procedure for the shaft bearing-bearing housing assembly prevents relative movement between shaft bearing 12, 13 and bearing housing 1 and can be achieved with low costs and, in particular, does not require any additional auxiliary materials and auxiliary means, such as adhesives, securing rings, pins or material deformations, in order to locate the axle bearing securely in the bearing housing 1. The impeller 8 and the drive part 7 are then fastened at the respective shaft ends, whereupon the shaft bearing-bearing housing assembly is operational. If the sealing gap between the bearing housing 1 and the impeller 8, is preset, the impeller 8 can be mounted onto the shaft 6 (see FIG. 8) before the bearing 13 is fitted into the bearing sleeve 2. For the water pump as shown, there is, during operation of the pump as a result of the pumping action, an axial main-loading direction as indicated in the figure by the force P which is effective in a bearing-sleeve engagement direction. The shaft bearing-bearing housing assembly produced makes allowance for this fact in that the cones of the outer surface 5 of the shaft bearing outer race 4 and of the sleeve inner wall 3 are tapered in the main-loading direction, with the result that the loading can be particularly well absorbed by the assembly. It is quite apparent that the rest of the water-pump components, which are well known in principle, can be mounted in a conventional manner without any changes.

What is claimed is:

1. A process for producing a shaft bearing-bearing housing assembly, in particular for a vehicle cooling-water pump, including a shaft bearing having an outer race with an outer surface which is firmly engaged by a surrounding annular surface of a bearing housing, said process comprising the steps of:

providing a shaft bearing with an outer race having a conical outer surface, providing a bearing housing with a conical receiving bore corresponding to the conical outer surface of said shaft bearing outer race and said bearing housing having an annular surface consisting of a material which shrinks upon cooling, fitting said shaft bearing into said receiving bore, while said bearing housing annular surface is at a temperature which is greater than a later operation temperature of said assembly, and permitting said bearing housing to cool down so as to provide for firm engagement between the shaft bearing outer race and bearing housing annular surface.

2. A process according to claim 1, wherein said outer surface of said shaft bearing outer race and said bearing housing annular surface are formed at a cone angle of between 1.9° and 2.1°.

3. A process according to claim 1, wherein said bearing housing is produced by an aluminum or magnesium casting process.

4. A process according to claim 3, wherein, after said casting process, said bearing housing is subjected to a punch deburring step to remove burrs from said bearing housing and said shaft bearing is fitted into said receiving bore in said bearing housing immediately after said punch deburring step.

5. A process according to claim 3, wherein, after said casting process, said bearing housing is permitted to cool down to ambient temperature and is reheated before said shaft bearing is fitted into said receiving bore.

6. A process according to claim 1, wherein said shaft bearing outer race is provided with a rough outer surface before it is fitted into said receiving bore.

7. A process according claim 1, wherein a unitized axial slide ring seal is fitted in the region of said axial shaft bearing which interacts with the cone end section of said bearing housing annular surface which has the wider diameter.

8. A process according to claim 1, wherein a combination structure comprising said shaft bearing and an axial slide ring seal is provided and said combination structure is fitted in an assembled state into said receiving bore.

* * * * *